United States Patent
Asad et al.

(10) Patent No.: US 6,539,093 B1
(45) Date of Patent: Mar. 25, 2003

(54) KEY RING ORGANIZER FOR AN ELECTRONIC BUSINESS USING PUBLIC KEY INFRASTRUCTURE

(75) Inventors: Khalid Asad, Frederick, MD (US); Michael A. Brown, Vienna, VA (US); Adarsh Gupta, Potomac, MD (US); Manjit Singh Kohli, Germantown, MD (US); J. Matthew Sebastian, Reston, VA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/223,803

(22) Filed: Dec. 31, 1998

(Under 37 CFR 1.47)

(51) Int. Cl.⁷ .............................. H04L 9/08; H04L 9/32
(52) U.S. Cl. .................... 380/279; 380/280; 713/155; 713/201; 705/67; 705/71
(58) Field of Search ................. 380/279, 280; 713/152, 153, 156, 159, 168, 175, 176, 201; 705/67, 71

(56) References Cited

U.S. PATENT DOCUMENTS

| | | | | |
|---|---|---|---|---|
| 5,850,442 A | * | 12/1998 | Muftic ....................... | 380/21 |
| 5,850,446 A | * | 12/1998 | Berger et al. ................ | 380/24 |
| 6,304,974 B1 | * | 10/2001 | Samar ........................ | 713/201 |

* cited by examiner

Primary Examiner—Justin T. Darrow
(74) Attorney, Agent, or Firm—David M. Shofi

(57) ABSTRACT

Users and security aware applications are able to request operations on and manipulate role based digital certificates (and their corresponding private keys) distributed among multiple key rings through the use of a Key Ring Organizer (KRO). In a typical use of the KRO, the computer network is coupled to a secure server and at least one end-user terminal; a Registration Authority; and an organization server hosting secure applications. The end-user terminal includes a general purpose Web browser with a KRO plug-in module and a KRO managing a set of key rings, where each key ring may contain multiple keys. The KRO components include the KRO, a set of KRO catalogs (typically one), a built-in key ring, and multiple external key rings. A key ring can be of any type, including a smart card, key disk, or remote file. A catalog (typically a file) contains a set of entries in which each entry contains a set of attributes and a reference to a key record stored in a key ring. Public key data is stored in a catalog during key generation and later verified against the certificate to be stored in a key ring in order to maintain the integrity of the association between references in a catalog and the key pairs to which they refer. A built-in key ring is contained within each catalog and is managed by end-users like any other key ring; however, outside the KRO environment, a built-in key ring is not accessed independently from the catalog which contains it. This mechanism greatly increases mobility. In a typical client-server session the KRO is accessed by a secure server application using Key Ring Organizer Language (KROL) messages sent to the KRO plug-in over a secure protocol (e.g., SSL) to generate, store and select role based keys for use in signing documents or authenticating end-users. The KRO provides a mechanism whereby signature requests are always authorized by the owner of the signing private key. The KRO also allows digital key parameters to be configured by the end-user so that authentication request must be authorized by the user as well.

16 Claims, 8 Drawing Sheets

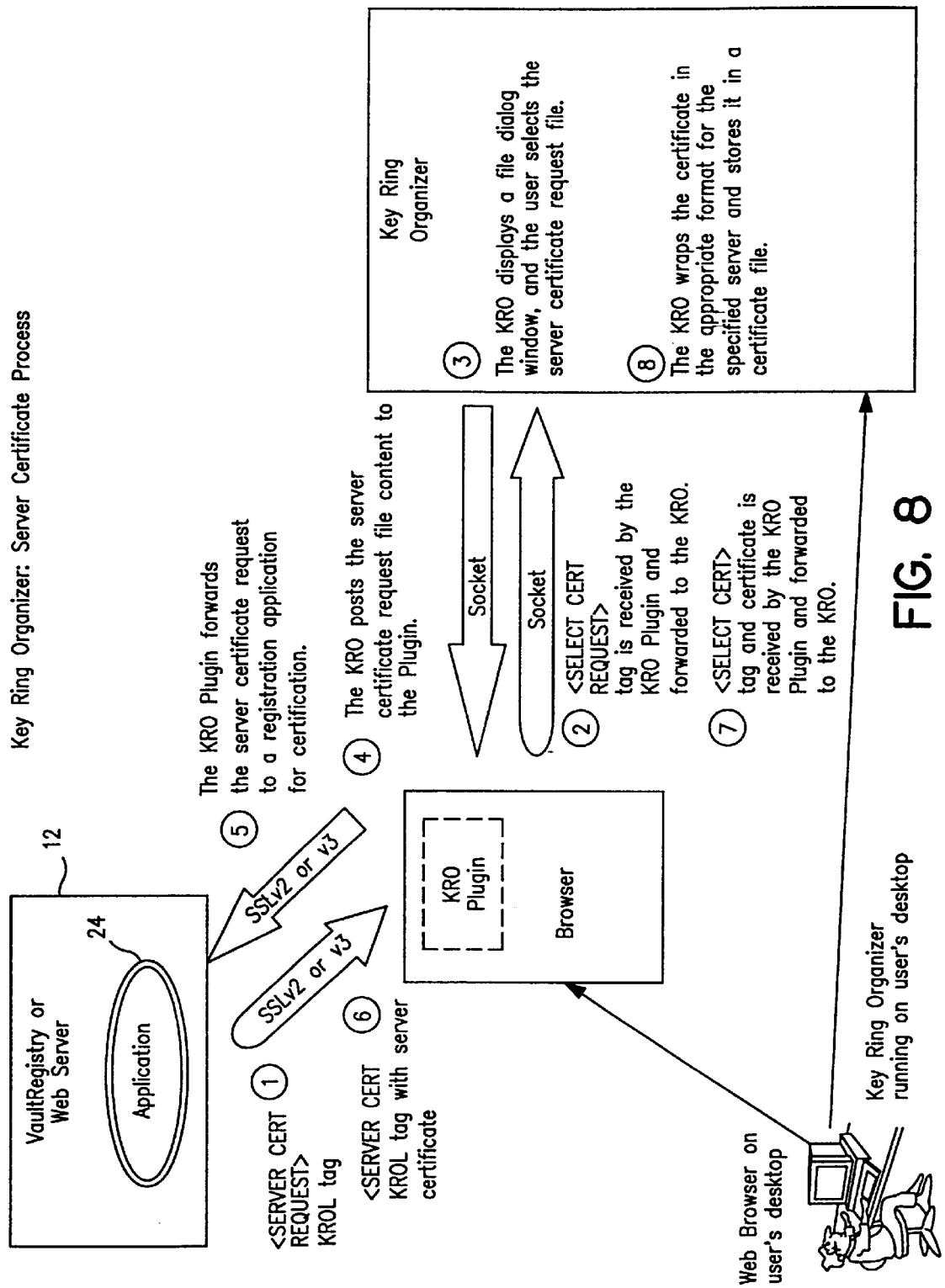

KEY RING ORGANIZER FOR AN ELECTRONIC BUSINESS USING PUBLIC KEY INFRASTRUCTURE

CROSS-REFERENCE TO RELATED APPLICATIONS

1. This application is related to non-provisional application Ser. No. 08/980,022 (SE9-97-005/1963-7131-US1) filed Jun. 13, 1997 now U.S. Pat. No. 6,105,131 A, assigned to the same assigned as that of the present invention and fully incorporated herein by reference.
2. This application is further related to Provisional Application Serial No. 60/087,974 filed Jun. 4, 1998, assigned to the same assignee as that of the present invention and fully incorporated herein by reference.
3. This application is related to application Ser. No. 09/223,834 U.S. Pat. No. 6,438,680 B1, filed Dec. 31, 1998 (SE9-98-022), assigned to the same assignee as that of the present invention and fully incorporated herein by reference.

BACKGROUND OF THE INVENTION

1. Field of the Invention

This invention relates to secure end-to-end communication systems and methods of operation. More particularly, the invention relates to a Key Ring Organizer (KRO) supporting public key infrastructure with secure end-to-end communications in conducting electronic business in a distributed information system, e.g., the Internet.

2. Background Discussion

The cross-referenced applications describe a new approach to conducting electronic business on the Internet. In this approach, digital keys replace end-user identification-password pairs as in the prior art. Public key cryptography uses mathematically related public/private key pairs. Only the private key can decrypt the information the public key has encrypted. The public key can be made available to anyone. The private key is kept secret by the holder. Just as digital keys are replacing end-user identification password, digital signatures are replacing physical signatures. A digital signature is a coded message affixed to a document or data that helps guarantee the identity of the sender, thereby providing a greater level of security than a physical signature. A digital signature identifies the sender because only the sender's private key can create the signature. The key also helps ensure that the content of the signed message cannot be altered without the recipient being able to discover that the message has been altered.

Digital certificates are also replacing their physical counterpart—hard copy credentials in electronic business. Digital certificates issued by a Certification Authority vouch for (or certifies) the key of an individual, software application, organization or business. The certificate performs a role similar to that of a driver's license or a medical diploma—the certificate certifies that the bearer of the corresponding private key is authorized by an organization to conduct certain activities within that organization. As electronic business systems having secure end-to-end communications increase their use of public key infrastructure, the end-users must be able to own and hold pubic/private key pairs providing access to applications made available by business organizations for providing services and other interaction with the end-users. The value of a key pair is a function of the value of the application to which the pair access. Hence, a key which enables a end-user to withdraw millions of dollars of cash is considered quite valuable—in effect, equal to the value of the cash to which access is enabled.

Business application providers determine the universality of keys their applications will accept for authentication. In many cases—especially for applications of greater value—the application provider will insist on a key issued for the express purpose of using that application and will not enable the application to accept a general purpose key pair. Keys used in this respect are dedicated to specific applications or roles for which the end-user is qualified and are, therefore, referred to as "role-based" keys.

As electronic business systems using public key infrastructure grow in popularity and the applications that exploit the infrastructure increase in number and value, end-users will need to retain an increasingly large number of "role-based" keys. Such keys will be stored on a variety of key rings. Some keys will be available on key rings stored in files using a standard format. Other keys will be stored on Smart Cards or other types of crypto hardware.

Accordingly, there is a need for end users to manage digital certificates as more and more certificates are accumulated to enable access to various Web-based business applications. Further, these Web-based business applications will need to initiate client operations on specific certificates, e.g., for authentication and encryption.

Prior art related to electronic business systems using public key infrastructure includes the following:

U.S. Pat. No. 4,914,176 issued Jul. 10, 1990 discloses an apparatus and method for validating that key management function requested for cryptographic key have been authorized by the originator of the key. A control vector checking unit and cryptographic instruction storage coupled to an instruction storage and a master key storage coupled to the processing means provide a secure location for executing key management function in response to received service requests.

U.S. Pat. No. 4,771,459 issued Sep. 13, 1988 discloses a system for storing and distributing keys for cryptographically protected communication. By assigning, in each group of terminals, keys to the terminals belonging to the group, the quantity of keys to be stored in each terminal can be significantly reduced.

U.S. Pat. No. 5,481,610 issued Jan. 2, 1996 discloses standardized key storage for different crypto systems. The keys are stored in an encrypted form such that their identities are not readily revealed by a dump of memory contents. The keys are extracted from a stored table and re-encrypting the entire table each time a key loader is attached to a radio.

None of the prior art discloses a system and method in which a Key Ring Organizer allows an end-user to generate, store, manage and select keys for use in digital signing of information or authenticating an end-user thereby enabling secure client/server applications to be used in an electronic business system.

SUMMARY OF THE INVENTION

An object of the invention is a Key Ring Organizer using public key infrastructure in an electronic business system requiring secure end-to-end communication.

Another object is a Key Ring Organizer and method of operation which organizes digital keys and key rings through the use of a catalog file.

Another object is a Key Ring Organizer and method of operation which provides attributes for digital keys as a basic database capability to allow a catalog file to be searched for a specific key.

Another object is a Key Ring Organizer and method of operation which allows end-users to store their keys in a convenient group which provides tracking, retrieval and security.

Another object is a Key Ring Organizer and method of operation which allows a key ring to be stored on a Smart Card, PC card, or file located on a end-user's hard disk or diskette.

Another object is a Key Ring Organizer and method of operation which implements a set of key properties for each key and stores these key properties on a key ring along with the associated key.

Another object is a Key Ring Organizer which generates authentication and signing keys and specifies the intended use of a key as a further security enhancement.

Another object is a Key Ring Organizer and method of operation which generates client authentication using digital authentication keys which may be invoked by a Web application through a request message containing certificate and server attributes for locating specific keys.

Another object is a Key Ring Organizer and method of operation which performs digital signatures using signing keys which may be invoked by a Web application using a request message containing certificate and server attributes to locate specific keys.

Another object is a Key Ring Organizer which provides support for certifying external keys for various third party applications invoked by a Web application through a request message.

Another object is a Key Ring Organizer Language (KROL) for supporting Key Ring Organizer operations These and other objects, features, and advantages are achieved in a computer network to which is coupled a secure server and at least one end-user terminal; a Registration Authority terminal; and an organization server. The end-user terminal includes a general purpose Web browser including a key ring Plug-in or equivalent and a Key Ring Organizer managing a set of key rings. A Smart Card reader is coupled to the end-user terminal for key mobility. Keys used for signing and authentication of messages between the end-user terminal and the secure server are stored in the key ring and managed by the Key Ring Organizer. The KRO may be accessed by a secure server to generate, store and select keys for use in signing information or authenticating an end-user thereby providing an end user access to secure applications. The KRO components are a key ring, key catalog and cryptographic hardware. The key ring stores keys in files or in crypto hardware, e.g. Smart Card. The key catalog is used to organize digital keys and key ring information enabling applications and end-users to select and identify a specific key for a particular use. The KRO maintains a reference to each key named in the catalog and the key ring on which the key is physically stored.

DESCRIPTION OF DRAWING

The invention will be further understood from the following detailed description of a preferred embodiment taken in conjunction with an appended drawing, in which:

FIG. 8 is a representation depicting the interaction among a Web server and the KRO in the process of FIG. 3 in using the Key Ring Organizer Language (KROL) for server certifications.

DESCRIPTION OF PREFERRED EMBODIMENT

Figure 1:
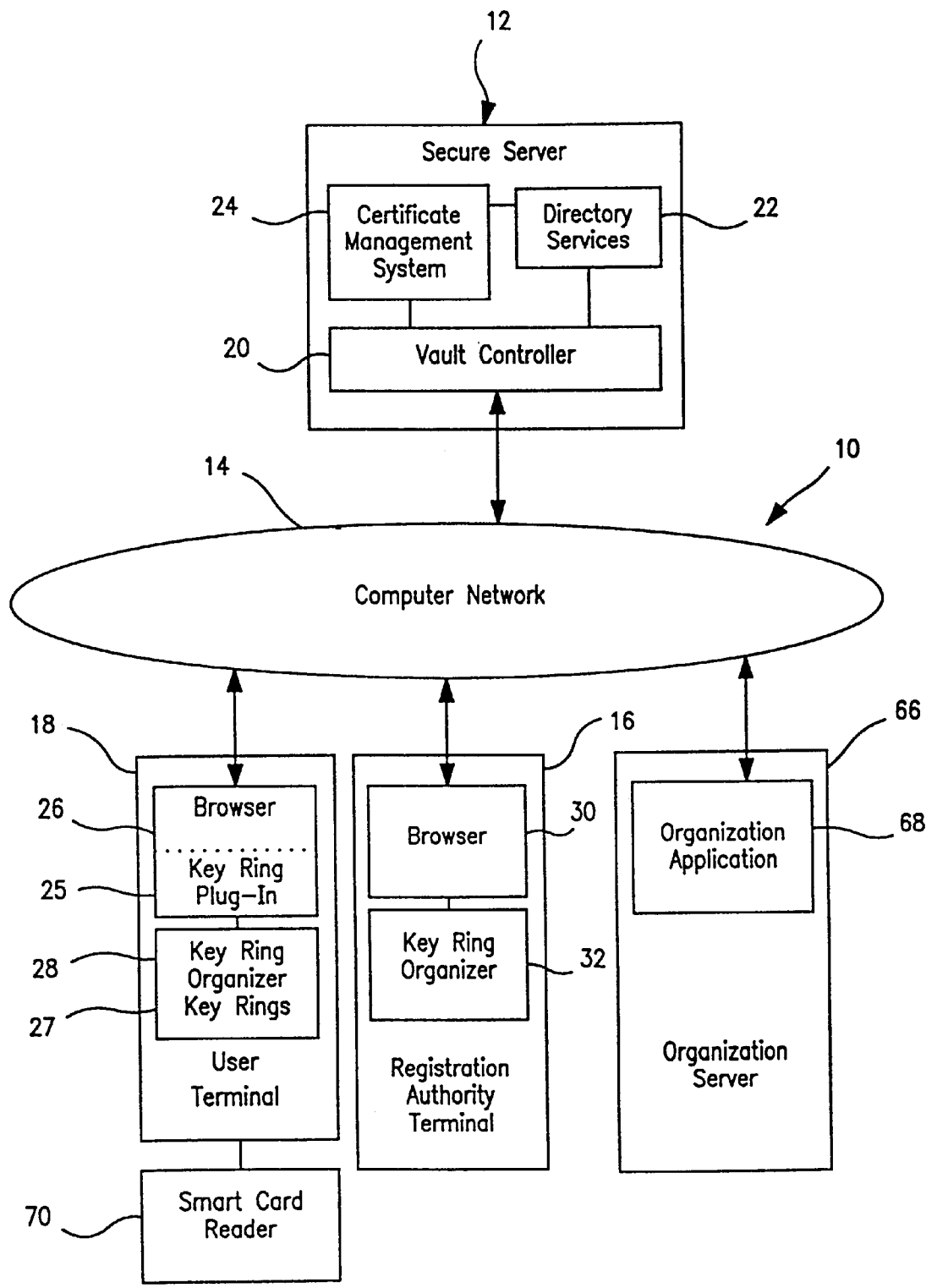
FIG. 1 is a representation of a secure end-to-end communication system in a computer network using a Key Ring Organizer (KRO) and incorporating the principles of the present invention.

FIG. 1 discloses a secure end-to-end communication system for conducting electronic business using public key infrastructure. The details of the system are described in cross-referenced application Ser. No. 08/980,022 filed Nov. 26, 1997 now U.S. Pat. No. 6,105,131A, and provisional application Serial No. 60/087,974 filed Jun. 4, 1998, assigned to the same assignee as the present invention and fully incorporated herein by reference. Briefly, the system 10 includes a Web-based secure server 12, for example, the Lotus Domino Web server. The server is coupled to a computer network 14 for serving a Registration Authority 16 and an end-user terminal 18. The network may also be coupled to an organization server 66 for running business specific applications.

The server 12 includes a Vault Controller 20 which provides processes and storage and personal vaults for Registration Authority 16; an X.500 directory 22; and a certificate management system 24. The Controller provides the secure environment for running a secure vault-based registration process and running secure business applications of organizations in secure areas or vaults for which only the owner has the key. Vaults are more fully described in the Related application Ser. No. 08/980,022, now U.S. Pat. No. 6,105,131A, supra. System operators, administrators, Registration Authorities and others cannot get to stored information in the vaults. The Controller enables secure registration transactions between end-users and organizations that may require multiple sessions.

The X.500 directory services 22 are based on ITU X.500 recommendations. The directory is intended as a global directory of information for communication (e-mail, crypto exchanges, telephone). The directory provide storage for specific items that are essential to public key infrastructure including:

1. Public Keys and Public Key Certificates
2. Certificate Revocation Lists
3. Disclosure Statements with respect to Certificate Authorities and Repositories
4. Access Guidelines, Policies & Fees A global directory based on X.500 is named the Directory and is physically distributed across multiple systems with different organizations or countries owning and managing different parts.

A Certificate Management System (CMS) 24 manages digital certificates for end-users and organizations. The system provides services such as issuing, revoking, suspending, resuming and renewing rights to use digital certificates. The system also supports Certificate Revocation Lists (CRL) which are a digitally signed, time-stamped lists of certificates that have been revoked by a certification authority. A Certification Authority(CA) is an entity, software application or person responsible for following an organization's security policies and assigning secure electronic identities in the form of certificates. The Certificate Authority processes requests to issue, renew, and revoke certificates and authorizes Registration Authorities to approve certificate application requests.

Communications between the end-user terminal 18 and the secure server 12 are conducted in a secure manner using a standard Internet Engineering Task Force (IETF) protocol for example, Secure Sockets Layer (SSL), developed by Netscape Communication Corporation, Mountain View, Calif. SSL provides secure communications by cryptographic algorithms include RSA and Message Digest 5 (MD5) provided by RSA Data Security, Incorporated, Bedford, Mass. SSL supports higher level protocols including HTTP, FTP and Telenet.

The end-user terminal 18 includes an application 26, e.g., a browser such as Netscape's Navigator 4.0™ or Microsoft's Explorer 4.0™ including a key ring Plug-in 25 that is responsive to end-user input and connects to remote applications across the computer network 14. A Key Ring Organizer 28 generates, stores, manages and selects keys on a set of key rings 27. In this embodiment, the Key Ring Organizer is a server which receives requests for digital keys from the client, a Web application. The requests are structured in a message consisting of Hypertext Markup Language (HTML) like command tags and data. The syntax for these messages is defined by a Key Ring Organizer Language (KROL) specification, set forth in Appendix 1. The Key Ring Organizer interprets the KROL to perform various cryptographic functions and returns the requested information to the application using the standard Common Gateway Interface (CGI) name value pair format.

An optional Smart Card 70 can be included in the end-user terminal to store keys for the purpose of signing and authentication.

The registration terminal 16 also includes a browser 30 and Key Ring Organizer 32. The registration terminal communicates with the secure server and end-user terminal over the computer network. The registration terminal includes a CPU, monitor, keyboard, mouse and other peripheral devices commonly associated with such computers. The terminal 16 could be a personal workstation, mainframe, laptop, or other network compatible device. The terminal includes an application (not shown) serving an entity (person or process) who decides whether an applicant or end-user qualifies to receive a certificate to conduct electronic business. The application validates an end-user so that the end-user and the user's public key can become certified and the end user can participate in business transactions.

The organization terminal 66 includes applications 68 which allow the end-user terminal 18 to communicate with the server 66 over the network 14. The organization server contains business applications which interact with a end-user through the secure server whereby exchanging digital certificates using public key infrastructure electronic business may be transacted between the end-user and the business organization. Applications invoke the services of the Key Ring Organizer using the request messages. These messages command the Key Ring Organizer to perform key operations including key pair generation, certificate storage, authentication, and signing.

The server 66 creates organization certificates which provide secure access to an organization's applications. Organization certificates are created by the organization's Certificate Management System (CMS) (not shown). Associated certificate application requests are approved by an organization's Registration Authority, for example, the terminal 16. Encryption certificates provide certification of encryption keys used in executing an organization's application in a personal vault in the Vault Controller 20. Signature certificates provide certification for signature keys in personal vaults used by applications executing in a vault.

The KRO receives requests for digital keys from the Controller 20. The requests are structured messages consisting of HTML-like command tags and data. The syntax for these messages is defined as Key Ring Organizer Language (KROL) specification set forth in Appendix I. The KRO uses a client server interface to receive and send ASCII data over TCP/IP sockets. The KROL specification is believed sufficiently complete to generate KRO messages without further explanation.

The KRO provides five significant features relevant to a set of key rings using a catalog and KROL messages: key generation; key properties assignments; certificate storage; client authentication; digital signing, and third party certification.

Figure 2:
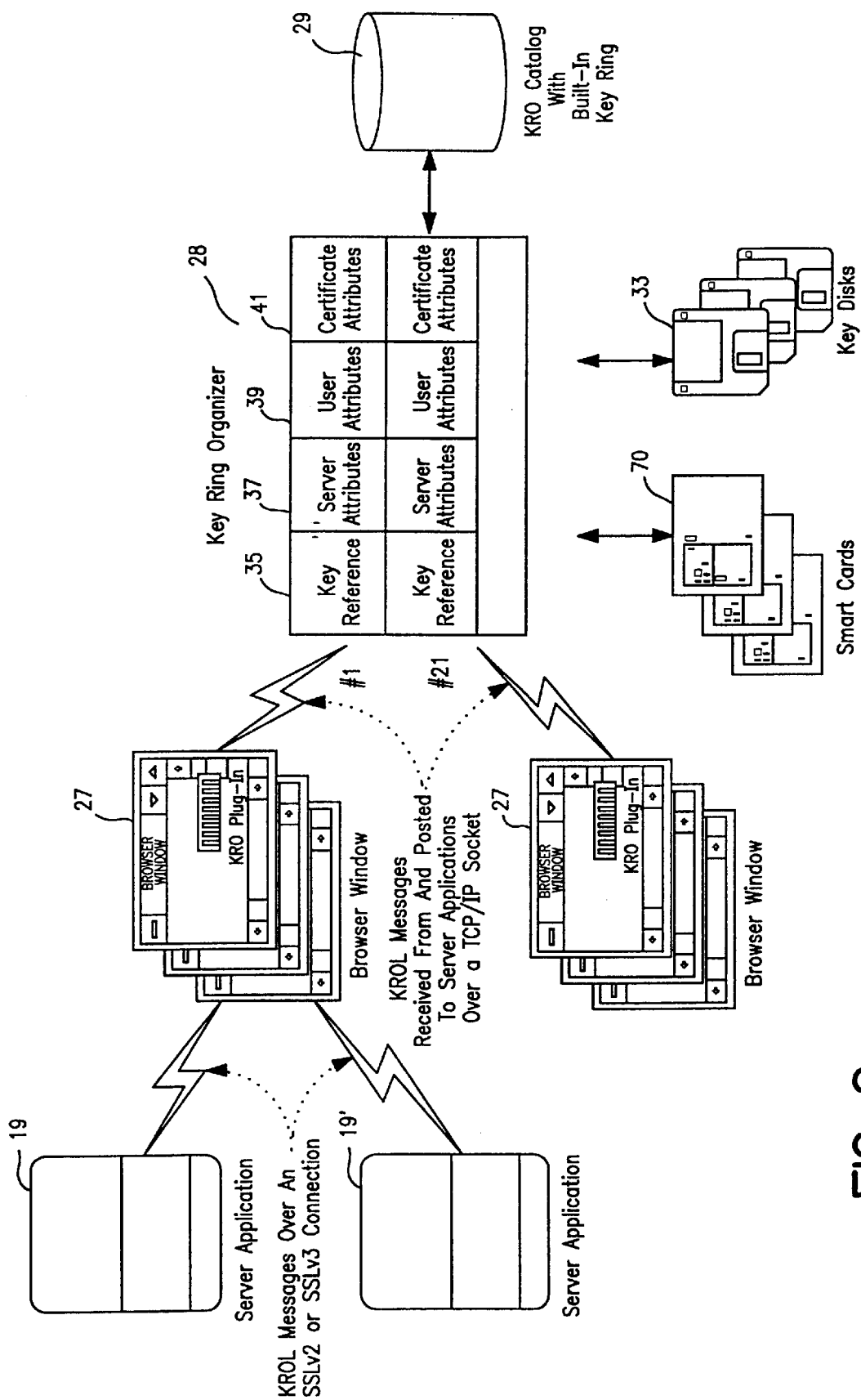
FIG. 2 is a representation depicting the interaction among a Web server and a end-user terminal in the system of FIG. 1, the terminal including a browser, Smart Cards and key disks for storing end-user keys and the KRO including a KRO catalog.

In FIG. 2, the end-user browser 26 interacts with secure applications 19, 19' in the secure Web server (not shown) and the KRO 28. The KRO interacts with a key catalog 29, Smart Cards 70, and key disk 33 and the server applications 19, 19' using a Key Ring Organizer language (KROL) described in Appendix 1. The KROL is used to construct a well defined message structure that is interpreted by the KRO. All messages must have a <command> and a <response to>:>KROL tag. Details of the commands and the response to:>tag are given in Appendix 1.

The KRO, through the use of the catalog file 29, organizes certificates distributed among a set of key rings. For each key in a key ring, the KRO maintains a record in the catalog with a key reference to it. To provide for key organization and key selection, the KRO associates attributes with each key. These attributes provide a basic database capability that allows the catalog file to be searched for a specific key.

In one embodiment, the KRO allocates a record #1 . . . N in the catalog for each key on a key ring. Each record contains a key reference 35 and a set of attributes 37, 39, 41 for each key stored in a key ring. Server attributes 37 are assigned by a server to help the server select a key relevant to a specific server application. Server attributes include, for example, application name and application title. End-user attributes 39 are assigned by the end-user to help organize keys and make them easier to find and identify. User attributes can be set when a key is initially made accessible through the catalog or any time thereafter. User attributes include, for example, application description and key storage location. Certificate attributes 41 are set by a Certification Authority(CA) at the time of certificate issuance and maintained in a public key certificate. Certificate attributes include, for example, subject Distinguished Name (DN) and expiration date.

The KRO provides a means to retain both the key catalog and a key ring in the same physical file although only one file is externally visible. This file implements a "built-in" key ring and contains logically two separate files: One containing the catalog, the other containing the keys. The "built-in"

key ring greatly simplifies portability for those end-user's who do not require that keys be stored on multiple key rings.

The KRO generates authentication and signing keys and enables an application to specify the intended use of a key. Through the use of properties assigned to these keys, an end-user can be alerted when an attempt is made to sign a document using a key that was not generated for the purpose of signing (e.g., the key length may be too short leading to an increased security risk if the key is used for signing). For each key that is generated, the public key is returned to the Web application for certification. An optional password can be set to password protect authentication keys for later usage. A password is mandatory for signing keys. The KRO stores certificates which include vault access certificates which provide an end-user with access to personal vaults in the secure Web server and organization certificates which are used to access secure business applications.

Figure 3:
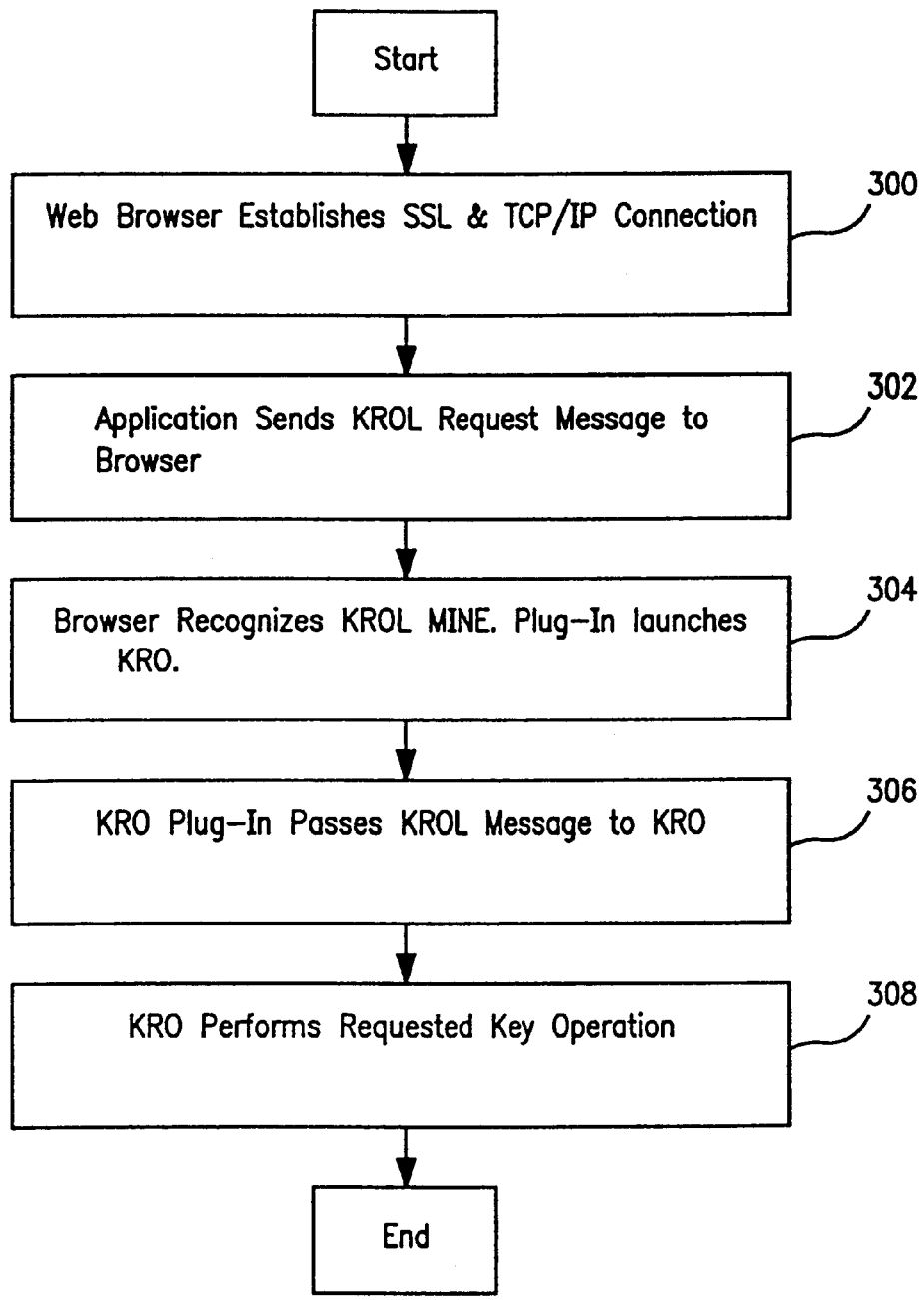
FIG. 3 is flow diagram showing the operation of the KRO in the system of FIG. 1.

In FIG. 3 the process of KRO and Web application interaction is initiated in step 300 in which the Web browser initiates a secure TCP/IP connection with an end-user using SSL.

In step 302 the Web application sends a request in the form of a KROL message to the end-user's Web browser.

In step 304 the end-user browser recognizes the KROL Multipurpose Internet Mail Extension (MIME) type which allows the interchange of data between the KRO and the web-based application. The end-user browser activates the KRO Plug-in which launches the KRO, if not already running.

In step 306 the KRO Plug-in passes the KROL message to the KRO.

In step 308 the KRO acting on the KROL message performs the requested key operations and sends a response to the Plug-in whereupon the interaction between the KRO and the Web application ends.

KRO operations include key generation, certificate storage, client authentication, digital signature, third-party certification, key management which are initiated and responded to using KROL messages.

Figure 4:
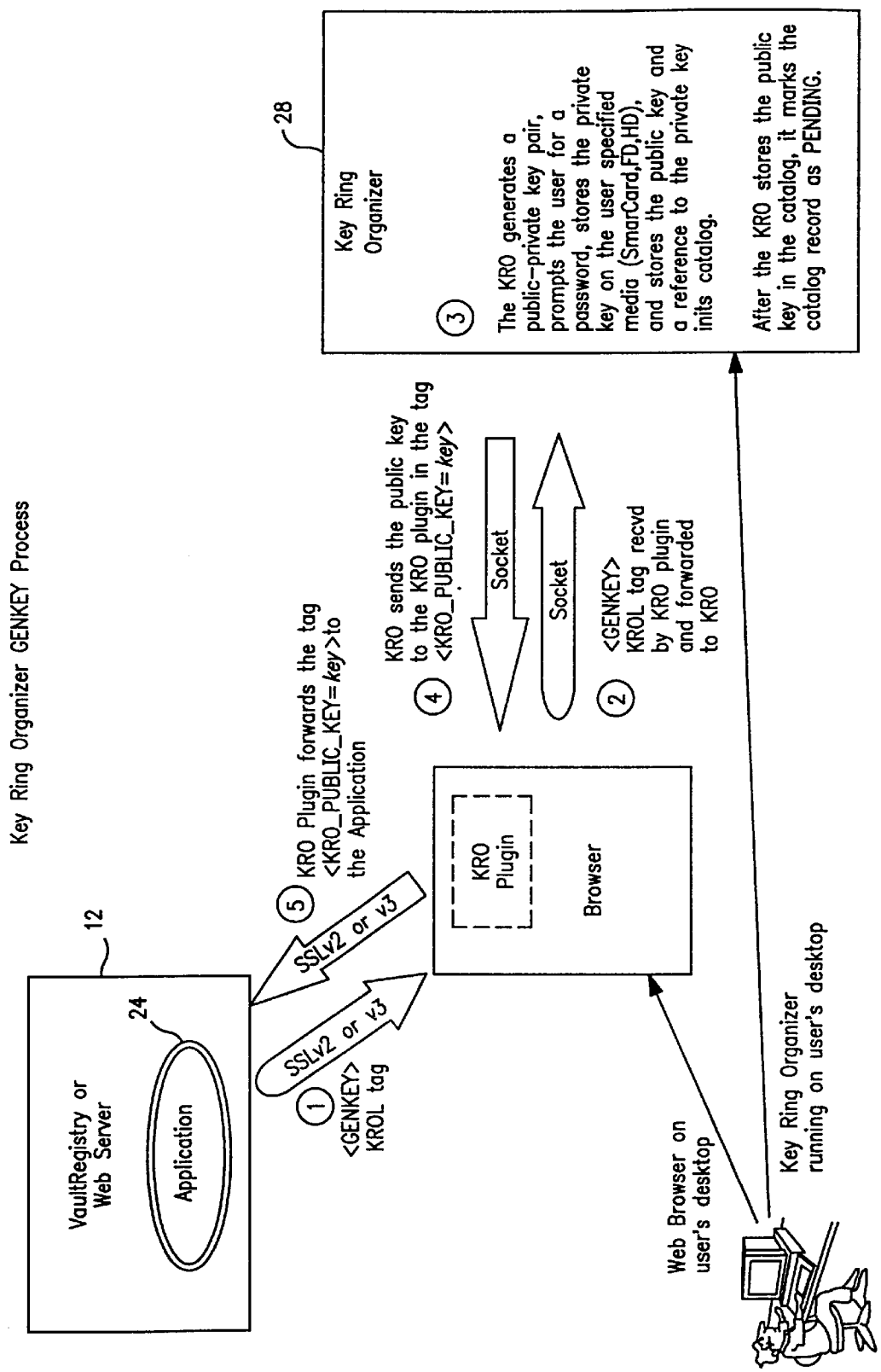
FIG. 4 is a representation of KRO Key Generation in the process of FIG. 3.

FIG. 4 discloses an illustrative process describing key generation using the KROL. The process is initiated in step 1 in which the server 12 initiates the command GENKEY as a KROL tag and transmits the tag to the browser 26 using SSLv2 or v3. In step 2, the KROL tag is received by the KRO Plug-in25 and forwarded to the KRO 28.

In step 3, the KRO generates a public-private key pair and stores the public key in a catalog 29 (not shown). The KRO stores the private key in a user specified storage location, e.g., Smart Card, hard disk, etc, and stores the public key and a reference to the private key in its catalog (Not shown). After the KRO stores the public key in the catalog, a catalog record for the key is marked PENDING.

In step 4, the KRO sends the public key to the KRO Plug-in using the tag KRO-PUBLIC-KEY.

In step 5, the KRO Plug-in forwards the tag KRO-PUBLIC-KEY to an application 19, typically a Registration Application running in the server 12.

Figure 5:
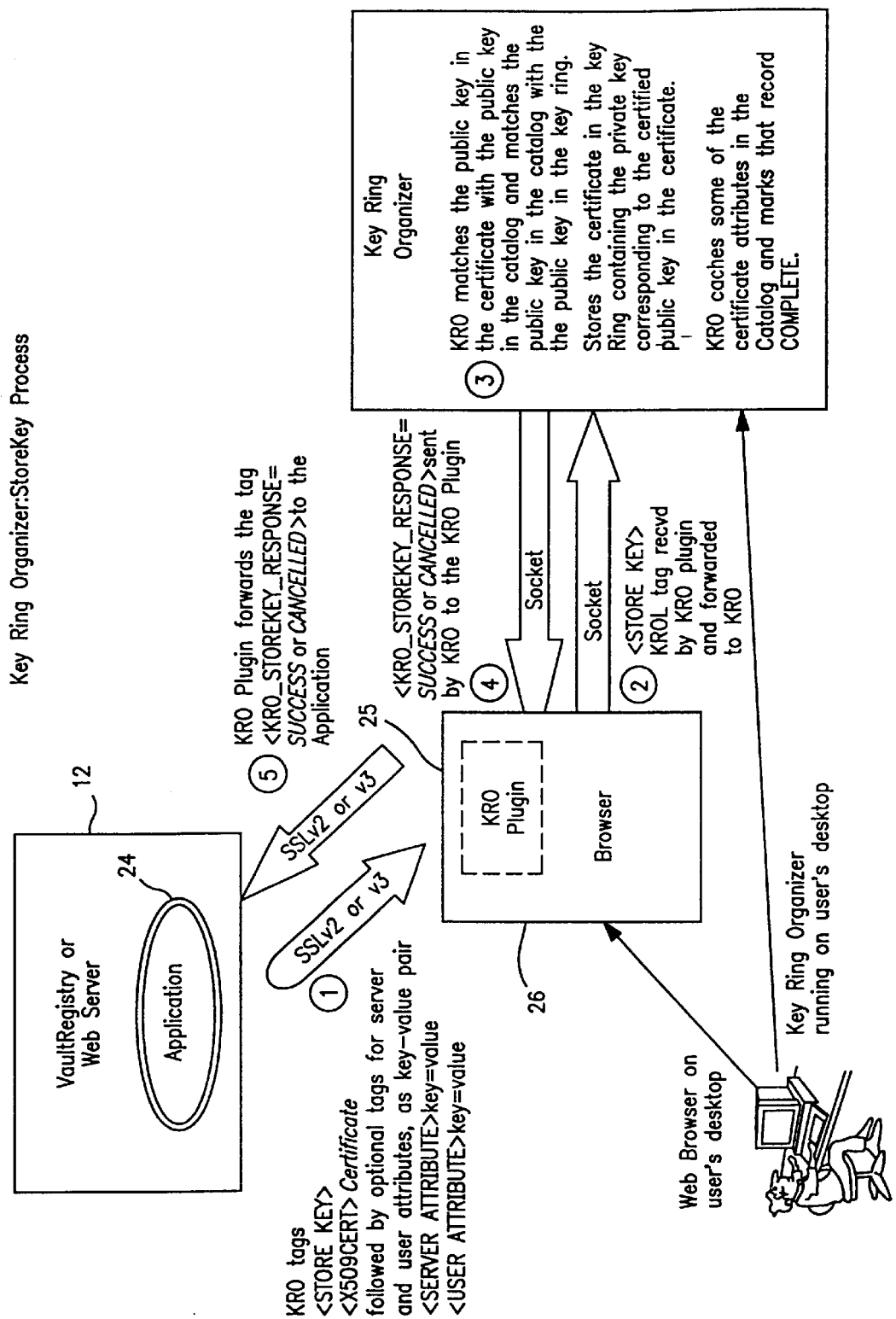
FIG. 5 is a representation depicting the interaction among a Web server and the KRO in the process of FIG. 3 in storing keys.

FIG. 5 discloses an illustrative process describing storing keys. In step 1, the Web server 12 sends to the browser 26 the KROL tags <STORE KEY> <X509 CERT> followed by optional tags for server <SERVER ATTRIBUTE> and users <USER ATTRIBUTE>. The KROL tags are transmitted to the browser using SSLv2 or v3.

In step 2, the STORE KEY tag is received by the KRO Plug-in 25 in the browser 26 and forwarded to the KRO.

In step 3, the KRO performs a series of integrity checks before storing the certificate, as follows: the KRO matches the public key in the certificate with the pubic key in the catalog and matches the public key in the catalog with the public key in the key ring. Thereafter, the KRO stores the certificate in the key ring containing the private key corresponding to the certified public key in the certificate. The KRO caches some of the certificate attributes in the catalog and marks the record COMPLETE.

In step 4, the KRO forwards the tag <STOREKEY_RESPONSE=SUCCESS or CANCEL> to the KRO Plug-in in the browser.

In step 5, the KRO Plug-in forwards the tag <KRO_STOREKEY_RESPONSE=SUCCESS or CANCEL> to the application, after which the process ends.

Figure 6:
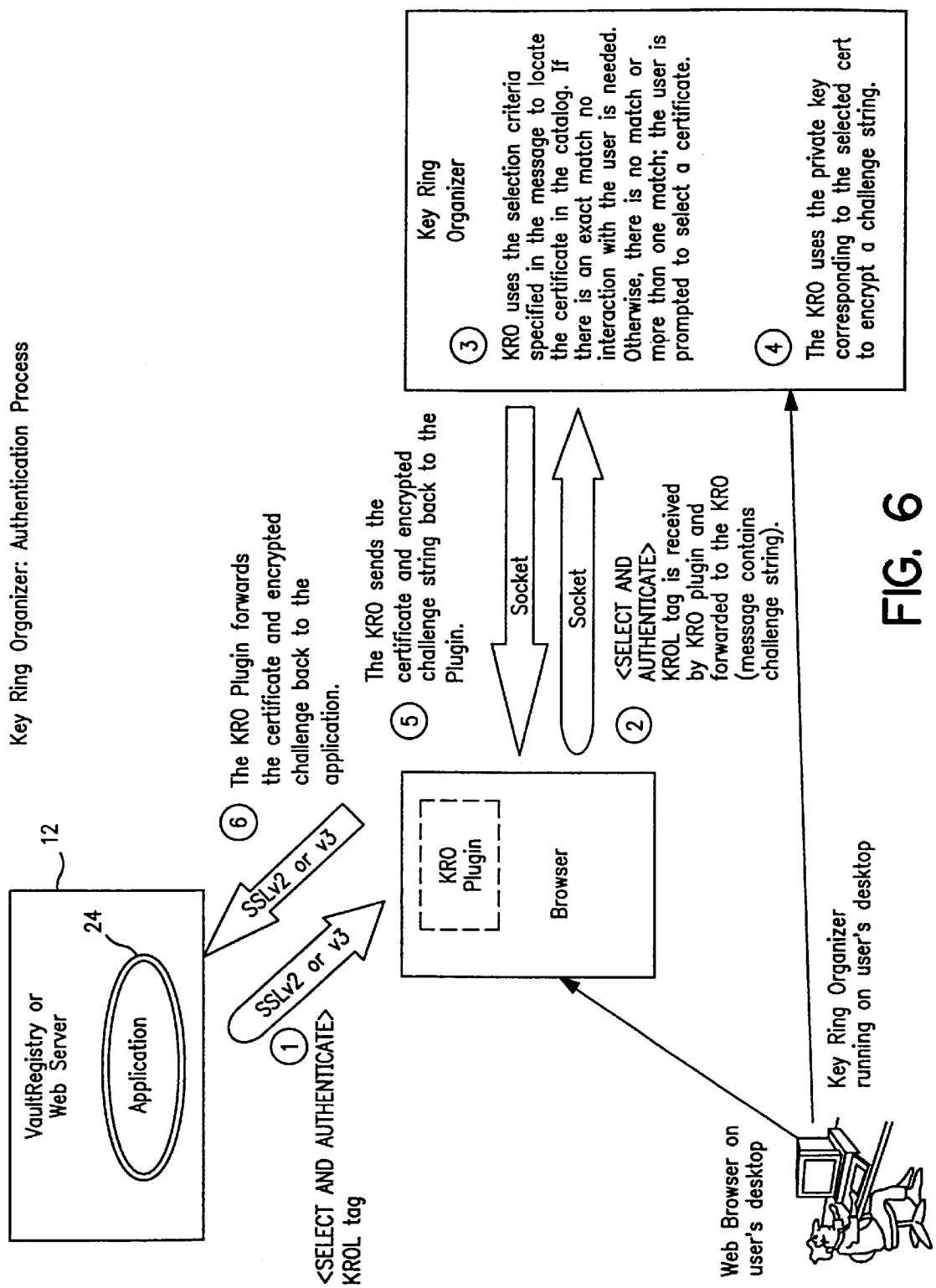
FIG. 6 is a representation depicting the interaction among a Web server and the KRO in the process of FIG. 3 for client authentication.

FIG. 6 discloses an illustrative process describing client authentication using digital certificates. In step 1, a Web application 24 that requires proof of client identity initiate a request to the KRO for client authentication using the KROL tag <SELECT AND AUTHENTICATE>. The request contains both certificate and server attributes for locating the authentication certificate. In step 2, the KROL tag is received by the Plug-in 25 and forwarded to the KRO 28. The request also includes a challenge string in the form of a random string or nonce. In step 3, the KRO uses the selection criteria or attributes specified in the message to locate the certificate in the catalog 29 (See FIG. 2). If there is an exact match no interaction with the end-user is required. Otherwise, if there is no match or more than one match, the end-user is prompted to select a certificate. In step 4, the KRO uses the private key corresponding to the selected certificate to encrypt the challenge string. In step 5, the KRO sends the selected certificate and encrypted challenge string back to the Plug-in which forwards the certificate and challenge to the application. In step 6, the application checks the validity of the certificate and if valid extracts the public key to verify that the decrypted nonce matches the original nonce sent in step 1. If there is a match the end-user authentication is successful.

Figure 7:
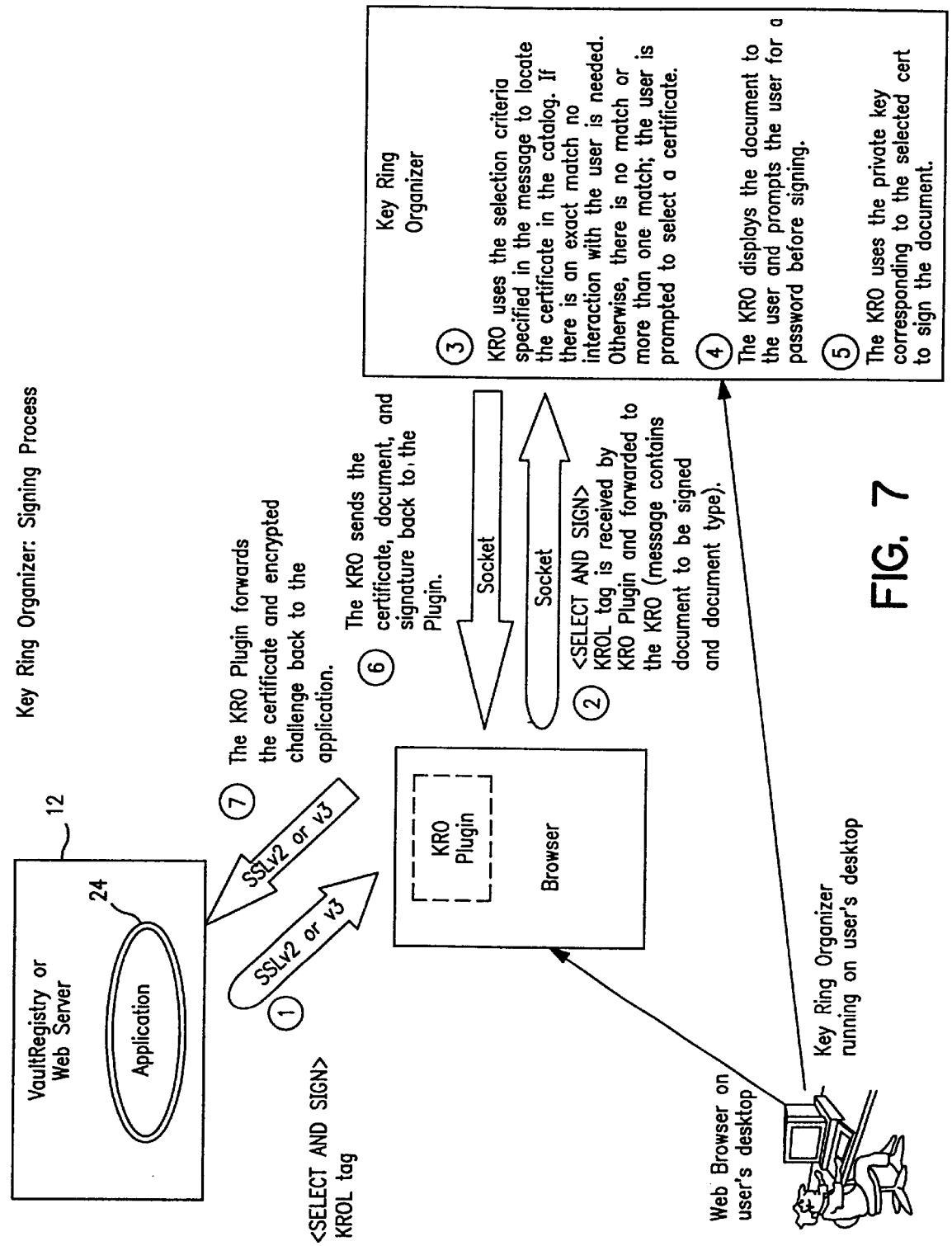
FIG. 7 is a representation depicting the interaction among a Web server and the KRO in the process of FIG. 3 for signing documents.

FIG. 7 discloses an illustrative process describing digital signing operations using signing private keys. Since a signed document has potential legal implications, all signing operations performed by the KRO are approved by the end-user. The KRO does not automatically sign a document on behalf of the end-user. In step 1, a Web application submits a signature request to the KRO using the KROL tag <SELECT AND SIGN>. The request can contain certificate and server attributes to locate a specific certificate. In step 2, the KROL tag is received by the Plug-in and forwarded to the KRO. The request message also includes the document to be signed and the document type. In step 3, the KRO uses the selection criteria specified in the message to locate the certificate in the catalog. If there is an exact match no interaction with the end-user is needed to select the certificate. Otherwise, if there is no match or more than one match the end-user is prompted to select a certificate. In step 4, the document to be signed is displayed to the end-user and the user is prompted for a password before signing, which unlocks the private key used for signing the document. In step 5, the KRO uses the private key corresponding to the selected certificate to sign the document. In step 6, the KRO returns the certificate, document and signature to the Plug-in which in step 7 returns the certificate, document and signature to the application.

FIG. 8 discloses an illustrative process describing server certification. The KRO supports certifying external keys for various third party applications including Netscape Server, IBM Connection Server; Netscape browser; and Microsoft Internet Explorer browser. For a given server, an administrator invokes a server administrative function to generate a server certificate request file. In step 1, a server certificate request is initiated by the Web application through a KROL tag <SERVER CERT REQUEST> which is sent to the Plug-in. In step 2, the request message is received by the Plug-in and forwarded to the KRO. In step 3, the KRO displays a file dialog window to the administrator and the administrator selects the server certificate request file for processing. In step 4, after the administrator has selected the file, the KRO sends the file content to the plug-in which transmits the server certificate request to a Registration Authority Terminal 16 (See FIG. 1) for approval and certification by a Certification Authority, a part of the Certificate Management System 24 shown in FIG. 1 and described in cross related application, Ser. No. 09/223,834 (SE9-98-022), supra. After the Registration Authority approves the request and the Certificate Authority creates a server certificate, the application in step 5 sends another KROL message with the tag <SERVER CERT> and includes the server certificate. In step 6, the tag and server certificate are received by the Plug-in and forwarded to the KRO. In step 7, the KRO brings up another dialog for the administrator and prompts the administrator to choose the file for storing the server certificate. The KRO wraps the server certificate in an appropriate format for the specified server and writes it out to the selected certificate file.

Preserving the integrity of the Key Ring catalog and key rings is addressed as follows: When a key pair is generated for a certificate, the public key is stored in the catalog and a key ring. The catalog key record for this public key is marked as pending. A handle is also created in the catalog that points to the location on the key ring where the certificate is to be stored. Later when a certificate is delivered to the KRO, the KRO performs a three way verification—the public key in the certificate is compared with the public key in the catalog, and the public key in the catalog is compared with the public key in the key ring. Additionally, when the public key is stored in the key ring, it is verified against the private key.

Summarizing, a KRO has been described to manage and protect multiple certificates in an electronic business system using public key infrastructure. With the KRO, private keys and certificates can be securely stored and managed in disk files, Smart Cards and PC cards. The KRO can generate, store and select keys for use in signing of digital information or authenticating the end-user thereby enabling end-user access to a host of secure client/server applications.

The Attached Appendix 1 entitled "Key Ring Organizer Language Specification (KROL)" provides details on messaging between the KRO and a client/server.

While the invention has been described in a preferred embodiment, various changes may be made without departing from the spirit and scope of the invention, as defined in the appended claims, in which:

APPENDIX I

Key Ring Organizer Language Specification (KROL)

Overview: The Key Ring Organizer (KRO) uses a Client-Server interface to receive and send ascii data over tcp/ip sockets. In this Client-Server model, the KRO is the server which listens for incoming requests from a client (a web-based application). KRO requests are structured messages consisting of HTML style-like command tags and data. The syntax for these messages is defined by the Key Ring Organizer Language Specification (KROL). The KRO interprets KROL to access underlying api calls. This document provides detailed information on KROL.
KRO message structure: KROL is used to construct a well defined message structure that is interpreted by the KRO to access underlying api calls. The KRO message structure is as follows:
<command>
<RESPONSE TO:>url <DATA>optional
data segment (data tags, name value pairs, keys) optional
Example: <SELECT AND AUTHENTICATE>
<RESPONSE TO: >http://www.worldregisuy.com/getcert
<DATA>
<NONCE>xehwsejd
<CERT ATTRIBUTE>serialnumber234324323432
<SERVER ATTRIBUTE>company4BM
<SERVER ATTRIBUTE>countiy=US
All messages must have a <command> and a <REPONSE TO:>KROL tag.
KROL Commands: The first line in a KRO message is a KROL command tag. The following is the complete list of KROL command tags:

| KROL command tags | Description |
|---|---|
| <GENKEY> | Generates a key on a supported media (SmartCard, keydisk) |
| <STORE KEY> | Stores a key on a supported media SmartCard, key disk |
| <SELECT AND AUTHENTICATE> | Selects a key on a supported media (SmartCard, keydisk) for client authentication. |
| <SELECT AND SIGN> | Selects a key on a supported media (SmartCard, keydisk) for signing a document |
| <GET ICS REQUEST> | Requests user to select an ICS server certificate request |
| <STORE ICS RESPONSE> | Stores the returned ICS certificate |

The command must be followed by a new line (return) character. Additional characters or data are not allowed on the first line.
<RESPONSE TO:>tag    The second line in a KRO message is the <RESPONSE TO:>KROL tag
followed by a URL. The KRO uses the IJRL to inform the KRO Netscape
Plugin where to post the KRO s response.
Example:    <GENKEY>
<RESPONSE TO:>http://www.worldregistry.com/getkey.exe
<DATA>
<KEY TYPE>authentication

APPENDIX I-continued

Key Ring Organizer Language Specification (KROL)

| | |
|---|---|
| | In the above example, the public key that was generated from the <GENKEY>KROL command tag in the KRO would be posted to www.worldregistry.com for the getkey script/program to process. |
| <DATA>tag | KRO messages can contain an optional <DATA>KROL tag to identify that the message has a data segment to be processed by the KRO. The data segment contains additional KROL tags to identify data components for the KRO to process. These data components include: key type, certificate, attributes associated with a certificate, nonce, document, and document type. |
| KROL Data tags | Data Segment tags identify data components to be processed by the KRO. These tags only valid in the data segment of the message. The following is the complete list of KROL data segment tags: |
| KROL Data Segment Type | Description |
| <APPLICATION>application name | Identifies the name of the application that has sent the KROL to request the KRO to perform a KROL command. This tag is required for all KROL messages |
| <KEY TYPE>type | Identifies the type of key to generate and the usage of the key. The valid types are (signing, authentication, encryption). The "ask user" type will cause the KRO to prompt the user to specify 1 of the other three types (signing, authentication, encryption). The <KEYTYPE. tag is used only with the <GENKEY.command tag. |
| <XSO9CERT>certificate data | Identifies the certificate in the data segment. The <X5O9CERT> tag must be followed by the certificate (base64 encoded). New lines (returns) are not allowed in the certificate. The <XSO9CERI> tag is used only with the <STOREKEY> command tag. |
| <SERVER ATTRIBUTE>name=value | Identifies a sewer attribute associated with a certificate. The <SERVER ATTRIBUTE> tag must be followed by the attribute in name=value format. The <SERVER ATTRIBUTE> tag is used only with the <SELECTAND AUTHENTICATE>, <STORE KEY>, or <SELECT AND SIGN> command tags. |
| <USER ATTRIBUTE>name=value | Identifies a user attribute associated with a certificate. The <USER ATTRIBUTE> tag must be followed by the attribute in name=value format. The <USER ATTRIBUTE> tag is used only with the <SELECTANDAUTHENTICA TE>, <STOREKEY>. or <SELECT AND SIGN> command tags. |
| <CER T ATTRIBUTE>name=value | Identifies a certificate attribute associated with a certificate. The <CERTATTRIBUTE> tag must be followed by the attribute in name-value format. The <CERTATTRIBUTE> tag is used only with the <SELECT AND AUTHENTICATE>, or <SELECTAND SIGN> command tags. |
| <NONCE>challenge string | Identifies the challenge string associated with the <SELECT AND AUTHENTICATE> command. The<NONCE> tag must be followed by a challenge string. The <NONCE> tag is used only with the <SELECTAND AUTHENTICATE> command tag. |
| <DOCUMENT>data | Identifies the document in the data segment to be signed. The <DOCUMENT> tag must be followed by the actual data for the document (base64 encoded). The <DOCUMENT> tag is used only with the <SELECTAND SIGN> command tag. |
| <DOCUMENT TYPE >type | Identifies the type of document in the data segment to be signed. The <DOCUMENT TYPE> tag must be followed by 1 of the following supported types (txt, doc). The type is used to determine the appropriate viewer to launch for displaying the document before it is signed. The <DOCUMENT TYPE> tag is used only with the <SELECTAND SIGN> command tag. |

Examples:
<APPLICATION>E-Bank
<KEY TYPE>signing
<X509CERT>MIICVjCCAb+gAwIBAgIEMnrH4TANBgkqhkiG9w0BA
QQFADAgMQswCQYDVQQGEwJVUzERMA8GA1UEChMISUJNU1R
BTIMwJhcROTYxMTE5MTUxMzEzKzAlMDAXETAwMTExOTElMT
MxAsIyswNTAwMEQxCzAJBgNVBAITAIPTMREwDwYDVQQKEWhJQ
kiTVEFOUzEiMAsGAlUEBRMENjY2NjATBgNVBAMTDENoYX.JsaW
UgR29vZDBcMAOGCSqGSIb3DQEBAQUAAOsAMEgCQQDK4kmXTa
yq/LLDijV9llaDrxJXWWbW]7YtwvfYqn+3fvukZVffokngelt3F874tzMAJ
iHXNvPocHfdD74L+yohAgMBAAGjgbQwgbEwPQYDVROZBDYwND
AyMDAxCzA.IBgNVBAYTAlVTMREwDwYDVQQKEwhjQklJQkITVEFOUz
EOMAwGAIUEAxMFQIJMMjAwFAYDVROBBA0wC4AJODQ2ODc4
MDU4MC8GAlUdAgQ0MCYECTg0NjkwNzM2MQMCB4AwFYETMT
k5OTA5MDgwODEzTMMrMDUwMDANBgNVHQoEBjAEAwlGQDAa

APPENDIX I-continued

Key Ring Organizer Language Specification (KROL)

```
BgkqhkiG9n0HQQAEDTALGwV2Mi4xZAMCB4AwDQYJKoZlhvcNAQ
EEBQADgYEAmugqDWmMkRscGE0Mv8GjvRAalaD8jsTEI5CSTtBrF
NjdPi7llzaUcEGCf3lgv/RmL3rN1QRRn8XClOzQHZkKpH0/0NPN4F
MRjOl3jhmpfna9Gl2xcPNqz8VKSpDqx07n3raZnlmFg/loen33w6Cluk
pPZhuL2uGm2H+Z6j4+OXw=
<SERVER ATTRIBUTE>company=IBM
<USER ATTRIBUTE>keylabel=IBM Human Resources Certificate
<CERT ATTRIBUTE>serialnumber=43278432832
<NONCE>xehwsejd
<DOCUMENT>LDijV9llaDrxJXWWbWtwvfYqn+3fvukZVff0kngelt
3F874tzMAJiHXNvP0cHfD74LUzEiMAsGA1UEBRMENjY2NjATBgN
B4AwDQYJKoZllhvcNAQEEBQADgYEAmugq
<DOCUMENT TYPE>at
Example KRO Messages:  The following examples have been provided as a guide for using KROL to
                       create properly formatted messages to access various functions within the KRO:
                       Generating a key on the KRO
                       <GENKEY>
                       <RESPONSE TO:>http://www.worldregistry.comlgetpublickey.exe
                       <DATA>
                       <KEY TYPE>authentication
                       <ALPPLICATION>E-Bank
Storing a key on the KRO
<STORE KEY>
<RESPONSE TO:>http://www.worldregistry.com/congratulations.exe
<DATA>
<X5O9CERT>MIICVjCCAb+gAwIBAgIEMnrH4TANBgkqhkiG9wOB
AQQFADAgMQswCQYDVQQGEwJVIJzERMA8GAIUEChMISUJN
UIRBTIMwJhcROTYxMTE5MTUxMzEzKZA1MDAXETAwMTExO
TEIMTMxMyswNTAwMEQxCzAJBgNVBAYTAIVTMREwDwYD
VQQKEwhJQk1TVEFOUzEiMAsGAIUEBRMENjY2NjATBgNVBA
MTDENoYXJsaWUgR29vZDBcMAOGCSqGSIb3DQEBAQUAAOsA
MEgCQQDK4kmXTayq/LLDijV9IIaDrxJXWWbWj7YtwvfYqn+3fvu
kZVff0kngeIt3F874tzMAJiHXNvPocHfD74L+yYohAgMBAAGjgbQ
wgbEwPQYDVROZBDYwNDAyMDAxCJBgNVBAYTAIVTMRE
wDwYDVQQKEwhJQklTVEFOUzEOMAwGAlUEAxMFQIJMMjA
wFAYDVROBBA0wC4AJODQ2ODc4MDU4MC8GA 1UdAgQoMCY
ECTg0NjkwNzM2MQMCB4AwFYETMTk5OTA5MDgwODEzMTM
rMDUwMDANBgNVHQoEBjAEAwIGQDAaBgkqhkiG9n0HQQAED
TALGwV2Mi4xZAMCB4AwDQYJKoZIhvcNAQEEBQADgYEAmug
qDWmMkRscGEoMv8GjvRAalaD8jsTEI5CSTtBrFNjdPi7IIZaUcEG
Cf31gv/RmL3rN1QRRn8XClOzOHZkKpH0/0NPN4FMRjOI3 fhmpfna
9Gl2xcPNqz8VKSpDqx07n3raZnlmFg/loen33w6CIukpPZhuL2uGm2
H+Z6J4+OXw=
<SERVER ATTRIBUTE>company=IBM
<SERVER ATTRIBUTE>country=US
<USER ATTRIBUTE>keylabel=IBM Human Resources Certificate
<APPLICATION>E-Bank
Authentication using a key on the KRO
<SELECT AND AUTHENTICATE>
<RESPONSE TO:>http://www.worldregistry.com/authenticate.eXe
<DATA>
<NONCE>xehwsejd
<CERT ATTRTBUTE>serial number=234324323432
<SERVER ATTRIBUTE>companry=IBM
<SERVER ATTRIBUTE>country=US
<APPLICATION>E-Bank
Signing Using a key on the KRO
<SELECT AND SIGN>
<RESPONSE TO:>http://www.worldregistry.com/inbox.eXe
<DATA>
<CERT ATTRIBUTE>serialnumber=234324323432
<SERVER ATTRIBUTE>company=IBM
<SERVER ATTRJBUTE>country=US
<DOCUMENT>ijV9llaDrxJXWWbWj7YtwvfYqn+3fvukcZVff0kngelt
3F874tzMAJiHXNvPocHfD74LUzEiMAsGA1UEBRMENjY2NjATB
gNB4AwDQYJKoZIhvcNAQEEBQADgYEAmugq
<DOCUMENT TYPE>txt
<APPLICATION>E-Bank
```

We claim:

1. A computer network including a secure server and at least one end-user terminal for managing and storing keys for use in signing information or authenticating end-users for secure client/server applications, comprising:

a) at least one end-user terminal including a general purpose Web browser; a key ring; and a Key Ring Organizer (KRO) as a server responsive to web applications;

b) crypto keys used for signing and authentication of messages between the end-user terminal and the secure server;

c) KRO means for storing and managing the keys in the key ring by key reference, client and server attributes; and d) catalog means coupled to the KRO for organizing the digital keys and key ring information enabling applications and end-users to select and identify a specific key for a particular use.

2. The computer network of claim 1 further comprising means for describing each key in the KRO with a reference number and a plurality of attributes.

3. The computer network of claim 1 further comprising means in the browser for interfacing the secure server and the KRO.

4. The computer network of claim 1 further comprising KRO means for generating role-based public/private pair key pairs for storage in the catalog.

5. The computer network of claim 1 further comprising KRO means for storing role-based private keys and certificates in key rings.

6. The computer network of claim 1 further comprising:
KRO means for locating a certificate in a catalog in response to a web or end user application request for authentication.

7. The computer network of claim 1 further comprising KRO means for locating a certificate in the catalog for signing a document.

8. The computer network of claim 1 further comprising KRO means for certifying public keys for third party servers.

9. The computer network of claim 1 further comprising a Smart Card coupled to the end-user terminal for key mobility.

10. The computer network of claim 1 further comprising a KROL language for communications between the end-user terminal and the secure server in conducting KRO operations.

11. In a computer network including a secure server and at least one end-user terminal for managing and storing keys for use in signing or authenticating end-users for secure client/server applications, a method for operating a Key Ring Organizer (KRO), comprising the steps of:

a) sending a request from a secure server application in the form of a KROL language message to the end-user's Web browser for the exchange of data with the secure server application running in the secure server;

b) recognizing a KROL Multipurpose Internet Mail Extension (MIME) type which allows the interchange of data between the KRO and the web-based application;

c) initiating a KRO Plug-in and launching the KRO, if not already running;

d) passing the KROL message to the KRO; and e) acting on the KROL message the KRO performs the requested key operations and sends a response to Plug-in for the Web-based application whereupon the interaction between the KRO and the Web application ends.

12. In a computer network including a secure server and at least one end-user terminal for managing and storing keys for use in signing or authenticating end-users for secure client/server applications, a method for operating a Key Ring Organizer (KRO), comprising the steps of:

a) sending a request in the form of a KROL language message to the end-user's Web browser for the exchange of data with an application running in the secure server;

b) recognizing a KROL Multipurpose Internet Mail Extension (MIME) type which allows the interchange of data between the KRO and the web-based application;

c) initiating a KRO Plug-in and launching the KRO, if not already running;

d) passing the KROL message to the KRO;

e) acting on the KROL message the KRO performs the requested key operations and sends a response to Plug-in for the Web-based application whereupon the interaction between the KRO and the Web application ends;

f) initiating a GENKEY request in which the server initiates the command GENKEY as a KROL tag and transmits the request to the browser using SSLv2 or v3;

g) receiving the KROL tag by a KRO plug-in and forwarding the request to the KRO;

h) generating a public-private key pair and storing the pairs in a catalog and marking a record PENDING;

i) sending the public key to the KRO Plug-in using the tag KRO-PUBLIC-KEY=KEY; and j) forwarding the tag KRO-PUBLIC-KEY=KEY to the application.

13. In a computer network including a secure server and at least one end-user terminal for managing and storing keys for use in signing or authenticating end-users for secure client/server applications, a method for operating a Key Ring Organizer (KRO), comprising the steps of:

a) sending a request in the form of a KROL language message to the end-user's Web browser for the exchange of data with an application running in the secure server;

b) recognizing a KROL Multipurpose Internet Mail Extension (MIME) type which allows the interchange of data between the KRO and the web-based application;

c) initiating a KRO Plug-in and launching the KRO, if not already running;

d) passing the KROL message to the KRO;

e) acting on the KROL message the KRO performs the requested key operations and sends a response to Plug-in for the Web-based application whereupon the interaction between the KRO and the Web application ends;

f) generating the KROL tags <STORE KEY><X509 CERT> Certificate followed by optional tags for server <SERVER ATTRIBUTE> and users <USER ATTRIBUTE> as key value pairs, as follows: Server Attribute KEY=VALUE; User Attribute KEY=VALUE;

g) transmitting the KROL request from the server to the browser using SSLv2 or v3;

h) receiving the STORE KEY request by a KRO Plug-in in a browser and forwarding to a KRO;

i) matching the public key in the certificate with the public key in a catalog and matching and verifying the public key in the key ring with the private key in the key ring;

j) storing the certificate in the Key Ring containing the private key corresponding to the public key in the certificate;

k) caching some of the certificate attributes in the catalog and marking a record COMPLETE;

l) forwarding the tag <STOREKEY_RESPONSE=SUCCESS or CANCEL> to the KRO Plug-in in the browser; and m) forwarding the tag <KRO_STOREKEY_RESPONSE=SUCCESS or CANCEL>to the application.

14. In a computer network including a secure server and at least one end-user terminal for managing and storing keys for use in signing or authenticating end-users for secure client/server applications, a method for operating a Key Ring Organizer (KRO), comprising the steps of:

a) sending a request from a secure server application in the form. of a KROL language message to the end-user's Web browser for the exchange of data with the secure server application running in the secure server;

b) recognizing a KROL Multipurpose Internet Mail Extension (MIME) type which allows the interchange of data between the KRO and the web-based application;

c) initiating a KRO Plug-in and launching the KRO, if not already running;

d) passing the KROL message to the KRO;

e) acting on the KROL message the KRO performs the requested key operations and sends a response to Plug-in for the Web-based application whereupon the interaction between the KRO and the Web application ends;

f) initiating a request to the KRO for client authentication using the KROL tag <SELECT AND AUTHENTICATE>, the request containing certificate and/or server attributes for locating the authentication certificate;

g) receiving the KROL request by a Plug-in and forwarding to the KRO, the request also including a challenge string in the form of a random string or nonce;

h) using selection criteria or attributes specified in the request to locate the certificate in a catalog;

i) determining if there is an exact match in which case no interaction occurs with the end-user is required; otherwise, if there is no match or more than one match, prompting the end-user to select a certificate;

j) using the private key corresponding to the selected certificate to encrypt the challenge string;

k) sending the selected certificate and encrypted challenge string back to the Plug-in which forwards the certificate and challenge to the application;

l) checking the validity of the certificate and if valid extracting the public key to verify that the decrypted nonce matches the original nonce sent in step b; and m) determining if there is a match in which case the end-user authentication is successful.

15. In a computer network including a secure server and at least one end-user terminal for managing and storing keys for use in signing or authenticating end-users for secure client/server applications, a method for operating a Key Ring Organizer (KRO), comprising the steps of:

a) sending a request from a secure server application in the form of a KROL language message to the end-user's Web browser for the exchange of data with the secure server application running in the secure server;

b) recognizing a KROL Multipurpose Internet Mail Extension (MIME) type which allows the interchange of data between the KRO and the web-based application;

c) initiating a KRO Plug-in and launching the KRO, if not already running;

d) passing the KROL message to the KRO;

e) acting on the KROL message the KRO performs the requested key operations and sends a response to Plug-in for the Web-based application whereupon the interaction between the KRO and the Web application ends;

f) submitting a signature request to the KRO using the KROL tag <SELECT AND SIGN>, the request containing certificate and/or server attributes to locate a specific certificate;

g) receiving the KROL request by the Plug-in and forwarding to the KRO, the request message also including the document to be signed and the document type;

h) using the selection criteria specified in the message to locate the certificate in the catalog;

i) determining if there is an exact message then no interaction with end-user is needed; otherwise, the end-user is prompted to select a certificate if there is no match or more than one match;

j) displaying a document to the end-user and prompting the end-user for a password before signing which unlocks the private key used for signing the document; and k) using the private key corresponding to the selected certificate to sign the document;

l) returning the certificate, document and signature to the Plug-in which returns the certificate, document and signature to the application.

16. In a computer network including a secure server and at least one end-user terminal for managing and storing keys for use in signing or authenticating end-users for secure client/server applications, a method for operating a Key Ring Organizer (KRO), comprising the steps of:

a) Sending a request from a secure server application in the form of a KROL language message to the end-user's Web browser for the exchange of data with the secure server application running in the secure server;

b) recognizing a KROL Multipurpose Internet Mail Extension (MIME) type which allows the interchange of data between the KRO and the web-based application;

c) initiating a KRO Plug-in and launching the KRO, if not already running;

d) passing the KROL message to the KRO;
e) acting on the KROL message the KRO performs the requested key operations and sends a response to Plug-in for the Web-based application whereupon the interaction between the KRO and the Web application ends;
f) invoking a server certificate request by the application through a KROL tag <SERVER CERT REQUEST> which is sent to a Plug-in;
g) receiving the request message by a Plug-in and forwarding the message to the KRO;
h) displaying a file dialog window to an administrator for selecting the server certificate request file for processing; d) after selection of the file, sending the certificate request to the Plug-in which transmits the certificate request to a Registration Authority for approval and certification by a Certification Authority;
i) after Registration Authority approval of the request, creating a server certificate;
j) sending another KROL message with the tag <SERVER CERT> and includes the server certificate;
k) receiving server certificate by the Plug-in and forwarding to the KRO;
l) displaying another dialog for the administrator and prompting the administrator to choose the file for storing the server certificate; and
m) wrapping the server certificate in an appropriate format for the specified server and writing it out to the selected certificate.

* * * * *

UNITED STATES PATENT AND TRADEMARK OFFICE
CERTIFICATE OF CORRECTION

| | |
|---|---|
| PATENT NO. | : 6,539,093 B1 |
| DATED | : March 25, 2003 |
| INVENTOR(S) | : K. Asad et al. |

It is certified that error appears in the above-identified patent and that said Letters Patent is hereby corrected as shown below:

<u>Title page, Item [54] and Column 1, line 2,</u>
Title, add the word -- SYSTEM -- after "BUSINESS".

<u>Column 1,</u>
Line 12, change second "assigned" to -- Assignee --.

<u>Columns 11 through 14,</u>
Appendix I, replace the examples with the following:

Examples:
<APPLICATION>E-Bank
<KEY TYPE>signing
<X509CERT>MIICVjCCAb+gAwIBAgIEMnrH4TANBgkqhkiG9w0BA
QQFADAgMQswCQYDVQQGEwJVUzERMA8GA1UEChMISUJNU1R
BTlMwJhcROTYxMTE5MTUxMzEzKzAlMDAXETAwMTExOTElMT
MxAsIyswNTAwMEQxCzAJBgNVBAITAlPTMREwDwYDVQQKEwhJQ
kiTVEFOUzEiMAsGA1UEBRMENjY2NjATBgNVBAMTDENoYX.JsaW
UgR29vZDBcMA0GCSqGSIb3DQEBAQUAA0sAMEgCQQDK4kmXTa
yq/LLDijV9llaDrxJXWWbW]7YtwvfYqn+3fvukZVff0kngelt3F874tzMAJ
iHXNvPocHfD74L+yYohAgMBAAGjgbQwgbEwPQYDVR0ZBDYwND
AyMDAxCzA.IBgNVBAYTAlVTMREwDwYDVQQKEwhJQklJQkITVEFOUz
EOMAwGAIUEAxMFQIJMMjAwFAYDVROBBA0wC4AJODQ2ODc4
MDU4MC8GA1UdAgQoMCYECTg0NjkwNzM2MQMCB4AwFYETMT
k5OTA5MDgwODEzTMMrMDUwMDANBgNVHQoEBjAEAwIGQDAa
BgkqhkiG9n0HQQAEDTALGwV2Mi4xZAMCB4AwDQYJKoZlhvcNAQ
EEBQADgYEAmugqDWmMkRscGEoMv8GjvRAalaD8jsTEI5CSTtBrF
NjdPi7llZaUcEGCf3lgv/RmL3rN1QRRn8XClOzOHZkKpH0/0NPN4F
MRjOl3fhmpfna9Gl2xcPNqz8VKSpDqx07n3raZnlmFg/loen33w6Cluk
pPZhuL2uGm2H+Z6J4+0Xw=
<SERVER ATTRIBUTE>company=IBM
<USER ATTRIBUTE>keylabel=IBM Human Resources Certificate
<CERT ATTRIBUTE>serialnumber=43278432832
<NONCE>xehwsejd
<DOCUMENT>LDijV9llaDrxJXWWbWtwvfYqn+3fvukZVff0kngelt
3F874tzMAJiHXNvPocHfD74LUzEiMAsGA1UEBRMENjY2NjATBgN
B4AwDQYJKoZllhvcNAQEEBQADgYEAmugq
<DOCUMENT TYPE>at

UNITED STATES PATENT AND TRADEMARK OFFICE
CERTIFICATE OF CORRECTION

| | |
|---|---|
| PATENT NO. | : 6,539,093 B1 |
| DATED | : March 25, 2003 |
| INVENTOR(S) | : K. Asad et al. |

It is certified that error appears in the above-identified patent and that said Letters Patent is hereby corrected as shown below:

Columns 11 through 14 (cont'd),

Example KRO Messages: The following examples have been provided as a guide for using KROL to create properly formatted messages to access various functions within the KRO:
Generating a key on the KRO
<GENKEY>
<RESPONSE TO:>http://www.worldregistry.comlgetpublickey.exe
<DATA>
<KEY TYPE>authentication
<ALPPLICATION>E-Bank
Storing a key on the KRO
<STORE KEY>
<RESPONSE TO:>http://www.worldregistry.com/congratulations.exe
<DATA>
<X5O9CERT>MIICVjCCAb+gAwIBAgIEMnrH4TANBgkqhkiG9w0B
AQQFADAgMQswCQYDVQQGEwJVIJzERMA8GAIUEChMISUJN
UIRBTIMwJhcROTYxMTE5MTUxMzEzKZA1MDAXETAwMTExO
TEIMTMxMyswNTAwMEQxCzAJBgNVBAYTAIVTMREwDwYD
VQQKEwhJQk1TVEFOUzEiMAsGAIUEBRMENjY2NjATBgNVBA
MTDENoYXJsaWUgR29vZDBcMA0GCSqGSIb3DQEBAQUAA0sA
MEgCQQDK4kmXTayq/LLDijV9IIaDrxJXWWbWj7YtwvfYqn+3fvu
kZVff0kngeIt3F874tzMAJiHXNvPocHfD74L+yYohAgMBAAGjgbQ
wgbEwPQYDVR0ZBDYwNDAyMDAxCzAJBgNVBAYTAIVTMRE
wDwYDVQQKEwhJQkITVEFOUzEOMAwGA IUEAxMFQIJMMjA
wFAYDVR0BBA0wC4AJODQ2ODc4MDU4MC8GA 1UdAgQoMCY
ECTg0NjkwNzM2MQMCB4AwFYETMTk5OTA5MDgwODEzMTM
rMDUwMDANBgNVHQoEBjAEAwIGQDAaBgkqhkiG9n0HQQAED
TALGwV2Mi4xZAMCB4AwDQYJKoZIhvcNAQEEBQADgYEAmug
qDWmMkRscGEoMv8GjvRAalaD8jsTEI5CSTtBrFNjdPi7IIZaUcEG
Cf31gv/RmL3rN1QRRn8XClOzOHZkKpH0/0NPN4FMRjOI3 fhmpfna
9GI2xcPNqz8VKSpDqx07n3raZnlmFg/loen33w6CIukpPZhuL2uGm2
H+Z6J4+OXw=

UNITED STATES PATENT AND TRADEMARK OFFICE
CERTIFICATE OF CORRECTION

PATENT NO.     : 6,539,093 B1
DATED          : March 25, 2003
INVENTOR(S)    : K. Asad et al.

It is certified that error appears in the above-identified patent and that said Letters Patent is hereby corrected as shown below:

Columns 11 through 14 (cont'd),

<SERVER ATTRIBUTE>company=IBM
<SERVER ATTRIBUTE>country=US
<USER ATTRIBUTE>keylabel=IBM Human Resources Certificate
<APPLICATION>E-Bank
Authentication using a key on the KRO
<SELECT AND AUTHENTICATE>
<RESPONSE TO:>http://www.worldregistry.com/authenticate.eXe
<DATA>
<NONCE>xehwsejd
<CERT ATTRTBUTE>serial number=234324323432
<SERVER ATTRIBUTE>companry=IBM
<SERVER ATTRIBUTE>country=US
<APPLICATION>E-Bank
Signing Using a key on the KRO
<SELECT AND SIGN>
<RESPONSE TO:>http://www.worldregistry.com/inbox.eXe
<DATA>
<CERT ATTRIBUTE>serialnumber=234324323432
<SERVER ATTRIBUTE>company=IBM
<SERVER ATTRJBUTE>country=US
<DOCUMENT>ijV9llaDrxJXWWbWj7YtwvfYqn+3fvukZVff0kngelt
3F874tzMAJiHXNvPocHfD74LUzEiMAsGA1UEBRMENjY2NjATB
gNB4AwDQYJKoZIhvcNAQEEBQADgYEAmugq
<DOCUMENT TYPE>txt
<APPLICATION>E-Bank Signed and Sealed this Second Day of December, 2003

JAMES E. ROGAN
*Director of the United States Patent and Trademark Office*